United States Patent [19]

Sonetaka et al.

[11] Patent Number: 4,518,347
[45] Date of Patent: May 21, 1985

[54] LIQUID FUEL COMBUSTION APPARATUS

[75] Inventors: Kazunori Sonetaka, Hirakata; Atsushi Nishino, Neyagawa; Tadashi Suzuki, Katano, all of Japan

[73] Assignee: Matsushita Electric Industrial Company, Limited, Japan

[21] Appl. No.: 542,896

[22] Filed: Oct. 18, 1983

Related U.S. Application Data

[63] Continuation of Ser. No. 188,271, Sep. 18, 1980, abandoned.

[30] Foreign Application Priority Data

Sep. 19, 1979 [JP] Japan .................................. 54-121134

[51] Int. Cl.³ .................................................. F23D 3/18
[52] U.S. Cl. ...................................... 431/325; 431/201
[58] Field of Search .................... 431/201, 298, 325; 252/459; 50/17, 19, 21; 65/31; 501/35, 36

[56] References Cited

U.S. PATENT DOCUMENTS

| | | | |
|---|---|---|---|
| 1,212,901 | 7/1914 | Chadwick | 431/201 |
| 2,686,451 | 8/1953 | Shafer | 431/325 |
| 2,756,158 | 7/1956 | Hahn et al. | 501/35 |
| 3,417,030 | 12/1968 | O'hara et al. | 252/459 |
| 3,687,850 | 8/1972 | Gagin | 65/31 |
| 4,325,724 | 4/1982 | Froberg | 501/35 |

FOREIGN PATENT DOCUMENTS

| | | | |
|---|---|---|---|
| 740024 | 8/1966 | Canada | 501/35 |
| 38086 | 12/1974 | Japan | 431/325 |
| 58134 | 5/1977 | Japan | 431/325 |

*Primary Examiner*—Samuel Scott
*Assistant Examiner*—Noah Kamen
*Attorney, Agent, or Firm*—Lowe, King, Price & Becker

[57] ABSTRACT

A liquid fuel combustion apparatus comprises a fuel tank, a wick partially immersed in fuel in the tank, and a combustion chamber enclosing the upper portion of the wick. The wick has two sections, one section being composed of a gasifying wick element of a glass fiber material which contains at least at the top portion thereof 80% or more of silica, alumina or a mixture thereof. The other section is a suction wick element having good fuel sucking properties. The wick may be integrally constituted of a glass fiber material which contains at least the top portion thereof 80% or more of silica, alumina or a mixture thereof. The combustion chamber preferably includes an inner cylinder, an outer cylinder and a red heat cylinder provided between the inner and outer cylinders.

25 Claims, 15 Drawing Figures

FIG. 3A    FIG. 3B
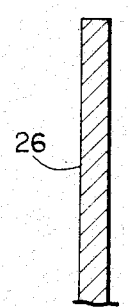
FIG. 4A    FIG. 4B    FIG. 4C
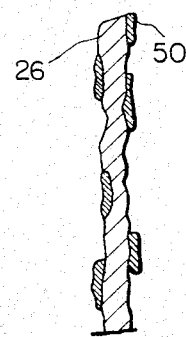
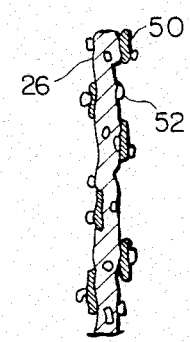
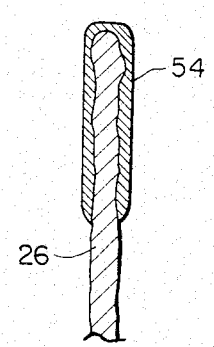

LIQUID FUEL COMBUSTION APPARATUS

This application is a continuation application of application Ser. No. 188,271, filed Sept. 18, 1980, now abandoned.

BACKGROUND OF THE INVENTION

1. Field of the Invention

This invention relates to an improved wick and to a liquid fuel combustion apparatus using the improved wick.

2. Description of the Prior Art

Liquid fuel combustion apparatus having burning wicks have been widely used, for example, as petroleum heaters or stoves. The existing wicks have drawbacks that when such heaters are used over a long period, tar-like or carbonaceous substances contained in the liquid fuel are gradually deposited and accumulated on the wick at the vaporizing or gasifying section or portion thereof. Accumulation of such substances make it difficult to allow smooth ignition of the heater and retard ability of the wick to ignite, impairing efficiency of combustion and causing the heater to operate in an unsatisfactory combustion state with harmful materials such as carbon monoxide being produced as residua in large amounts.

From a conservation standpoint, there is a recent trend to use a heavy oil as a liquid fuel. The use of heavy oil results in more accelerated accumulation of tar-like or carbonaceous residua causing the above-mentioned drawbacks become more considerable.

These drawbacks of prior art heaters are generally overcome by periodically subjecting a gasifying section of the burning wick to a blank burning where combustion is continued without supplying any fuel to the wick so as to remove the accumulated residua by combustion. However, since the gasifying section of existing burning wicks is ordinarily constituted of cotton fiber, staple fiber, or glass fiber assembled in a suitable form, these fibers may burn up or fuse during blank burning to such an extent that the wick is substantially unserviceable.

SUMMARY OF THE INVENTION

It is accordingly an object of the present invention to provide a liquid fuel combustion apparatus overcoming the above-mentioned disadvantages of prior-art apparatus.

It is another object of the invention to provide a liquid fuel combustion apparatus which has an improved wick in one or two sections.

It is a further object of the invention to provide a liquid fuel combustion apparatus having slight tendency to lower combustion efficiency by maintaining constant combustion conditions even when used for prolonged periods.

It is still a further object of the invention to provide a liquid fuel combustion apparatus including an improved wick having a gasifying section having at least at the top portion thereof a glass fiber material containing at least 80% of silica, alumina or a mixture thereof by which such section becomes heat-resistant and may serve as a catalyst for cracking fuel and decomposing tar-like or carbonaceous residue.

It is another object of the invention to provide an improved wick of the type just mentioned which is suitable for use in a liquid fuel combustion apparatus.

According to one aspect of the invention, a liquid fuel combustion apparatus comprises a fuel tank, a wick partially immersed in the fuel in the tank, and a means defining a combustion chamber enclosing the upper portion of the wick. The wick has two sections, one section being composed of a gasifying wick element of a glass fiber material which contains at least at the top portion thereof 80% or more of silica, alumina or a mixture thereof, with the other section composed of a suction wick element having a good fuel sucking property whereby fuel sucked from the suction wick element is gasified at the gasifying wick element and burned in the combustion chamber. The other section may be composed of two sub-sections, one sub-section constituting an upper portion of the other section, the other sub-section which is to be immersed in the fuel in the tank being preferably made of synthetic fibers such as polypropylene. Both wick sections are usually connected with each other for fuel combustion and adapted to be disconnected for the removal of tar-like or carbonaceous residua deposited on the gasifying wick element.

In accordance with a preferred embodiment of the invention, there is provided a liquid fuel combustion apparatus which comprises a fuel tank, an inner cylinder vertically disposed at the center of the fuel tank and having a multiplicity of apertures formed therein, an outer cylinder arranged to have a predetermined space between it and the outer surface of the inner cylinder, a red heat cylinder provided between the inner cylinder and the outer cylinder, the inner cylinder, outer cylinder and red heat cylinder establishing a combustion section or chamber, and a wick partially immersed in fuel in the tank the improvement which comprises said wick composed of two sections which are in contact with each other during combustion, one section being composed of a gasifying wick element having at least its top portion made of a glass fiber material containing 80% or more of silica, alumina or a mixture thereof, the other section composed of a suction wick element having a good fuel sucking property.

According to another aspect of the present invention, there is provided a liquid fuel combustion apparatus which comprises a fuel tank, a wick partially immersed in the fuel in the tank, and a means defining a combustion chamber enclosing the upper portion of the wick. The wick is made of glass fiber material wherein at least the top portion thereof has a content of silica, alumina or a mixture thereof ranging 80% or more. The wick may be constituted of two sections each made of glass fiber.

Also in accordance with the invention, there is provided a wick suitable for use in a combustion apparatus, which wick comprises a gasifying wick section having at least its top portion made of a glass fiber containing 80% or more of silica, alumina or a mixture thereof, and a suction wick section having a good fuel sucking property. The suction wick section may be constituted of two portions or two sub-sections, one portion being immersed in the fuel and made of cotton, staple fiber, synthetic fibers, glass fiber, asbestos or the like, preferably a synthetic fiber such as of polypropylene, the other portion which is interposed between the gasifying wick element and the one portion being made of cotton, staple fiber, asbestos, synthetic fibers, glass fiber, or the like fibers.

The glass fiber used to make the gasifying wick element is preferably made by subjecting an ordinary glass fiber to a dealkalization treatment so that a content of silica, alumina, or a mixture thereof is in the range of 80% or more. By the dealkalization treatment, the surfaces of the glass fibers are turned rough and this will produce several advantages which will be described in detail hereinat. As a matter of course, a glass fiber which originally contains, without dealkalization, silica, alumina or a mixture thereof in an amount of above 80%, inclusive, is likewise usable in the practice of the invention.

The glass fiber may have deposited partly on the surface thereof a porous material such as alumina, silica, silica-alumina, zeolite, cordierite, magnesia or the like or a catalyst with or without being supported on a carrier. Further, a porous material of a specific composition may be formed as a layer on at least the top portion of the glass fiber. By deposition or formation of the porous material or layer on the glass fiber, improved gasification of liquid fuel occurs due to an increasing effect of capillary action of such fiber.

BRIEF DESCRIPTION OF THE DRAWINGS

FIGS. 3A and B are enlarged views of glass fibers before and after dealkilization treatment, respectively;

FIGS. 4A, B and C are enlarged, schematic views of a glass fiber on which a porous material layer is deposited;

PREFERRED EMBODIMENTS OF THE INVENTION

Figure 1:
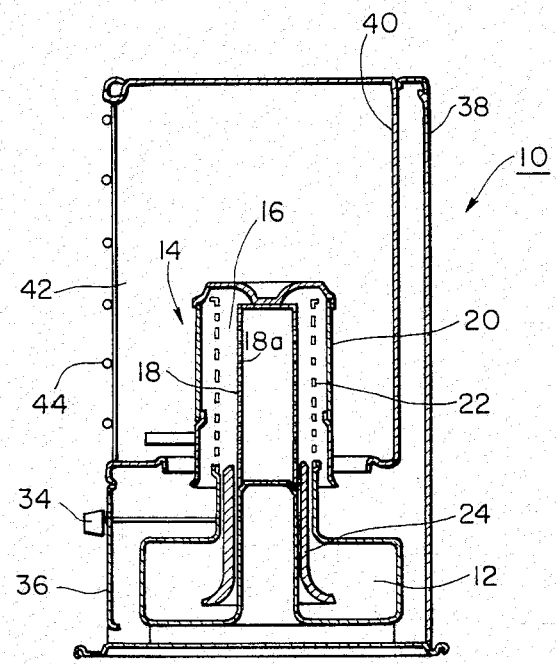
FIG. 1 is a schematic sectional view of a petroleum heater in accordance with an embodiment of the invention.
Figure 2:
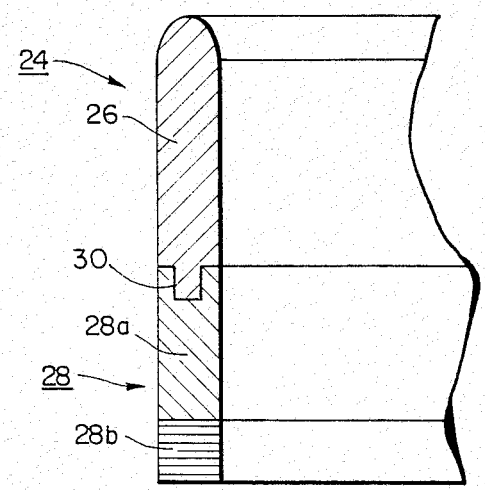
FIG. 2 is an enlarged view of a burning wick of the heater of FIG. 1.

Referring to FIGS. 1 and 2, a liquid fuel combustion apparatus 10 includes a fuel tank 12 containing liquid fuel therein. Tank 12 is provided with a fuel gauge (not shown) and a fuel supply port (not shown) as usual. Centrally of apparatus 10, a means 14 defines a combustion section or chamber 16. Means 14 is in the form of a cylinder having an inner cylinder 18 containing a multiplicity of apertures 18a, an outer cylinder 20 made of a heat-resistant glass and establishing a predetermined space between it and the outer peripheral surface of the inner cylinder 18, and a red heat cylinder 22 made of, for example, a lath netting and interposed between the inner cylinder 18 and the outer cylinder 20. These cylinders are arranged concentrically with each other. As a matter of course, the combustion section may not be arranged in cylindrical form but may be in any desired form. Combustion section 16 receives at its lower portion an upper portion of a wick 24 cylindrical in form from which fuel in tank 12 is sucked up and then gasified. Wick 24 is composed of a gasifying section 26 and a suction section 28 partly immersed in the fuel. Suction section 28 may be divided into two sub-sections 28a and 28b each made of cotton, a staple fiber, asbestos, a synthetic fiber, a glass fiber, or the like. In this case, sub-section 28b is immersed in the fuel. Gasifying section 26 and suction section 28 may be arranged to be disconnected at portion 30 as usual so as to facilitate interruption of fuel supply to section 26 when blank burning is conducted to remove residua deposited on the gasifying section.

The wick 24 is vertically movable by rotation of a knob 34 provided at a front plate 36 of a casing 38 in the form of a box.

In FIG. 1, a reflecting plate 40 reflects combustion heat from combustion section 16 towards an opening 42 provided at the front of casing 38. A guard member 44 swingably hinged, for example, to an upper part of reflecting plate 40 depends downwardly in front of the combustion section to protect people from injury.

The combustion apparatus of the just-described type is well known and is not described further in detail.

Hereinunder, detailed description will be given with regard to the wick of the apparatus.

As described, wick 24 is composed of gasifying section 26 and suction section 28. Gasifying section 26 should be made of a glass fiber and at least the top portion of the fiber should contain silica, alumina or a mixture thereof in an amount of 80% or more based on the fiber.

Suction section 28 may be made of any fiber materials such as cotton, staple fiber, asbestos, synthetic fiber, glass fiber or like fibers. When a glass fiber is used, it is not always required that the wick is composed of two sections. That is, the wick may be made entirely of a glass fiber without being divided into two sections provided that the top portion of the fiber has a content of silica, alumina or a mixture thereof in a range of 80% or more. Needless to say, the wick entirely made of a glass fiber may be divided into two sections as described hereinabove so as to facilitate a blank burning by interrupting fuel supply to the upper section of the wick.

Any glass fibers which have a content of silica, alumina or a mixture thereof in the range of 80% or more may be used in the practice of the invention. It is advantageous in view of economy to use ordinary glass fibers. Ordinary glass fibers generally have a composition of 50–70 wt % of $SiO_2$, 0–20 wt % of $Al_2O_3$, 5–20 wt % of $B_2O_3$ and 20–40 wt % of alkali components such as Na, K, Ca and Mg. In order to increase the content of silica, alumina or a mixture thereof in such ordinary glass fibers to a level of 80% or more, it will suffice to subject the glass fiber to an acid treatment to remove the alkali components therefrom. By dealkalization treatment, the glass fiber which has such a smooth surface as schematically shown in FIG. 3A is turned rough on the surface thereof as shown in FIG. 3B. This rough surface may be deposited locally with a silica powder 50 as shown in FIG. 4A or with a silica powder 50 and a carrier 52 for catalyst as shown in FIG. 4B. Alternatively, the rough surface may preferably be formed with a porous covering layer 54 at the upper portion thereof as shown in FIG. 4C.

The dealkilization treatment utilizing an acid is feasible by a known usual method. That is, a glass fiber is immersed to a desired level in concentrated hydrochloric acid or concentrated nitric acid, followed by shaking to eluate or remove not less than 50%, preferably not less than 80% of the alkali components from the glass fiber and then neutralizing the acid remaining on the surface of the fiber. The neutralized fiber should be washed well with water. By this treatment, the glass fiber composition is varied to have 70-90 wt % of $SiO_2$, 0-30 wt % of $Al_2O_3$, 5-25 wt % of $B_2O_3$, and 1-2 wt % of the alkali components such as Na, K, Ca and Mg.

This dealkilization treatment may be conducted prior to or after weaving of the fiber into cloth. From a viewpoint of ease in operation, it is preferable to conduct the treatment after weaving of the fiber.

The glass fiber which has been dealkilized and turned rough on the surface thereof has an improved capillary action and an increased retentivity of liquid fuel such as kerosene. The increased retentivity results in a low temperature of gasifying section 26, deposition of tar of carbonaceous residua being suppressed to a great extent. The improvement in the capillary action makes it easy to form porous materials (i.e. silica powder 50 and the carrier for catalyst 52) on the section or to deposit a catalyst, and is effective in preventing such deposits from being separated, ensuring stable combustion over a long period.

By the formation of the porous materials (the silica powder 50 and the carrier 52) or the porous covering layer 56, the capillary action, affinity for and retentivity of liquid fuel, and gasifying property of the glass fiber are improved and the formed materials or layer serves as a carrier for supporting a catalyst thereon, so that it can be made easy to suppress formation of tar-like or carbonaceous residua and to decompose the residua by blank burning even if such residua have been formed.

The porous materials usable in the practice of the invention are ordinary porous materials such as, for example, alumina, silica, silica-alumina, zeolite, cordierite, magnesia and the like.

The porous materials can be locally deposited on the glass fiber by any of known manners. For instance, an alumina sol of high concentration is diluted, in which gasifying section 26 of wick 24 is immersed, dried, and sintered to form an alumina deposit locally formed on the glass fiber of section 26.

A catalyst may be deposited on the glass fiber in gasifying section 26 and particularly on the thus deposited porous materials or layer.

The catalysts to be used in the present invention are those which serve to convert a liquid fuel into low molecular weight materials by cracking, those which serve to suppress formation of tars or the like, and those which serve to decompose produced tars at low temperatures.

Typical of the catalysts useful in the invention are metal oxides such as $MnO_x$, $CuO_x$, $NiO_x$, $CoO_x$, $FeO_x$, $CrO_x$, $AgO_x$, $VO_x$ and the like (where each x is an integer), compound oxides such as cordierite, zeolite, silica-alumina, cement and the like, and noble metals such as Pt, Pd, Ru and the like.

Alternatively, acid-base catalysts such as solid acids and solid bases may be used.

Examples of the solid acids include (1) natural clay minerals such as terra abla, kaolin, montmorillonite, and the like, (2) solidified acids such as, for example, phosphoric acid deposited on an alumina carrier, (3) cationic exchange resins, (4) silica-alumina, silica-magnesia, and the like, (5) inorganic chemicals such as ZnO, $Al_2O_3$, $TiO_2$, $CaSO_4$, $CuCl_2$ and the like.

Examples of the solid bases include (1) inorganic chemicals such as CaO, MgO, $K_2CO_3$, $BaCO_3$ and the like, (2) caustic soda deposited on an alumina carrier, (3) anionic exchange resins, (4) nitrous oxide-activated carbon, and the like.

These catalysts will be further described with reference to porous covering layer 54.

Porous covering layer 54 is formed on the gasifying section 26, by which the gasifying efficiency can be remarkably improved and this layer serves to suppress formation of tars and also to decompose them by blank burning. Further, wick 24 having such a gasifying section which has been formed thereon with the porous covering layer can be satisfactorily used to burn kerosene, light oil or like liquid fuels.

The porous covering layer is usually made of a composition which is comprised of an inorganic binder, a mat former, and a catalyst, and if necessary, a conductive metal.

These components will be described.

Inorganic Binder: Inorganic binders for the porous covering layer are those capable of being sintered at high temperatures of 450°-850° C. and include vitreous frits such as for iron, aluminium, castings and the like and those capable of being sintered at low temperatures of 250°-400° C. and including alkali silicates such as sodium silicate, lithium silicate, potassium silicate and the like, phosphoric acid and phosphates such as aluminium primary phosphate, aluminium secondary phosphate, magnesium phosphate and the like. At least one selected from the above compounds is used as an inorganic binder.

A preferable temperature at which a liquid fuel is gasified or vaporized should be above 200° C. If an organic binder is used, the adhesion strength will be lowered by a change in composition during its use or the porous covering layer will be separated from the fiber substrate, making it difficult to ensure stable combustion over a long period. It is more important to note that if the separation takes place, amounts of formed tar or carbonaceous residua abruptly increase and thus the combustion becomes unstable.

The inorganic binder has a stable bonding property over a long period and shows a satisfactory bonding strength when used under temperature conditions of 200° C. or more.

Mat Former: The mat former means a material which can impart irregularity or porosity to the surfaces or inside of the porous covering layer. The mat former should be porous and great in specific surface area so as to increase an area of contact with a liquid fuel. Typical examples of the mat former include alumina, silicon oxide, titanium oxide, various compound oxides such as mullite, corundum, sillimanite, chamotte, dolomite, zeolite, silica-alumina and the like. These mat formers are usually used in the form of particles. It is important that a size distribution and a pore distribution of the mat former gives a great influence on the porous layer. The mat former acts also as a carrier for a catalyst (particularly a noble metal catalyst) and even as a catalyst itself. The amount of the mat former depends on the type of inorganic binder, the type of the mat former itself, the type of liquid fuel to be used, the gasifying temperature, and the amount of gasification and should preferably be determined on each case.

Catalyst: The catalysts usable for this purpose are those which have been described hereinbefore. These catalysts may be used singly or in combination. In case where a catalyst is incorporated in the porous covering layer by mixing it with an inorganic binder and applying the mixture to a substrate, the metal oxides, compound oxides and acid-base catalysts are ordinarily used. As a matter of course, a noble metal or an acid-base catalyst may be applied onto a porous covering layer after formation of the layer with or without being mixed with the mat former. Alternatively, the catalyst may be mixed with an inorganic binder and then applied onto a glass fiber substrate, after which the same or different type of a catalyst may be further applied onto the layer surface. The manner of depositing a catalyst varies depending on the types of inorganic binder and mat former, the type of a liquid fuel used, and the like.

The porous covering layer may be composed of the inorganic binder alone when the vitreous frit is used and applied by a plasma jet technique. By this application, the layer surface becomes very rough or irregular. In general, however, a composition of the porous covering layer is preferably as follows:

| Inorganic binder | 20–100 parts by weight |
|---|---|
| Mat former | 2–80 parts by weight |
| Catalyst | 2–50 parts by weight |

The mat former and the catalyst may be used in combination within the above-defined ranges but either a mat former or a catalyst may be used singly but in combination with the binder, in which case an amount of the mat former or the catalyst is in the range defined above.

If necessary, metals such as aluminium, zinc, and the like or alloys may be added to the composition as a thermally conductive metal.

The porous covering layer is generally in a thickness of several tens to several hundreds microns and should preferably have a specific surface of 0.01 m²/g which will be particularly illustrated hereinafter.

The present invention will be particularly described by way of the following examples, in which percent and parts are by weight unless otherwise indicated.

EXAMPLE 1

Figure 5:
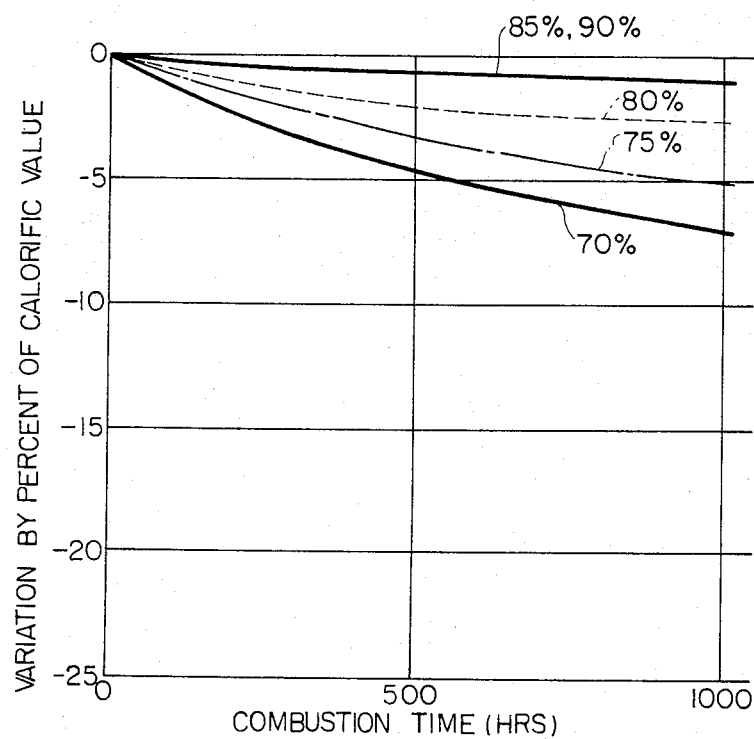
FIG. 5 is a graphical representation of a rate of variation of a calorific value in relation to variation in combustion time for glass fibers with different contents of silica, alumina or a mixture thereof.
Figure 6:
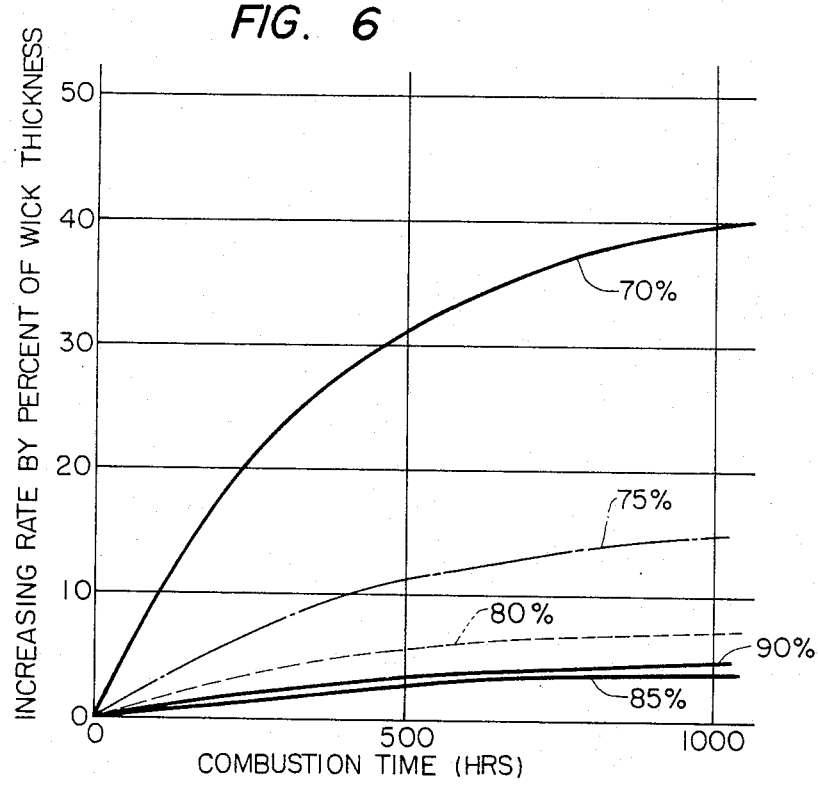
FIG. 6 is a graphical representation of an increase by percent of wick thickness in relation to variation in combustion time for different glass fibers.

A burning wick 24 which was composed of a gasifying section 26 of a glass fiber mass and a suction section 28 made of a sub-section 28a of cotton and a staple fiber and a sub-section 28b of a synthetic resin fiber such as a polypropylene fiber. The glass fiber of the gasifying section had a composition of 55% of $SiO_2$, 15% of $Al_2O_3$, 20% of alkali components, and a balance of others. Gasifying section 26 was immersed in concentrated nitric acid to a level of 10 mm from the top of the section to conduct the dealkalization treatment. As a result, glass fiber masses of five types having total contents of $SiO_2$ and $Al_2O_3$ of 70% (untreated), 75% 80%, 85% and 90%, respectively, were obtained. Each wick was set in position of a petroleum heater of such construction as shown in FIG. 1 (with a calorific value of 2200 kcal/hr when using kerosene) and the combustion was continued for 1000 hours with the results of a rate in variation of calorific value for each wick shown in FIG. 5 and of an increasing rate of the wick thickness, shown in FIG. 6, which thickness has a relation with an amount of formed tar.

From these figures, it will be seen that the wicks using the gasifying sections having 80% or more of $SiO_2$ and $Al_2O_3$ at its portion according to the invention show excellent combustion effects.

Figure 7:
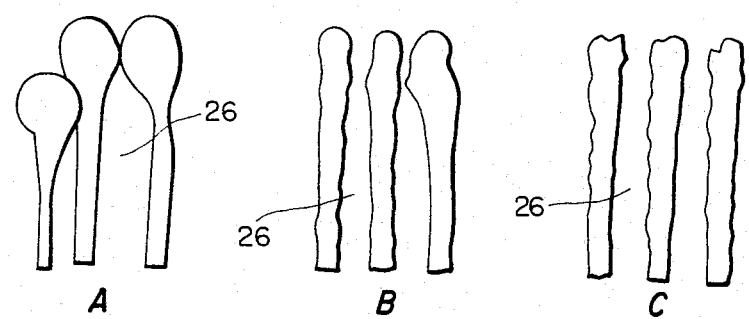
FIGS. 7A, B and C are schematic views of glass fibers with different contents of silica, alumina or a mixture thereof which have undergone blank burning.

The wicks which had been used for the combustion test of 1000 hours were then subjected to a test where each wick was subjected to a blank burning for 60 minutes after, the combustion of 1000 hours and this combustion and blank burning procedure was repeated five times in total. The shape of the gasifying section 26 of each of these elements is schematically shown in FIGS. 7A, 7B and 7C corresponding respectively to curves A, B and C in FIG. 9 in which A indicates a curve for the section having a $SiO_2$ and $Al_2O_3$ content of 70%, B indicates a curve for the section of a $SiO_2$ and $Al_2O_3$ content of 80%, and C indicates a curve for the section of a $SiO_2$ and $Al_2O_3$ content of 90%. From this, it will be seen that the glass fibers containing $SiO_2$ and $Al_2O_3$ in amounts of 80% or more have a good resistance to heat and are not molten when undergoing the blank burning.

Figure 8:
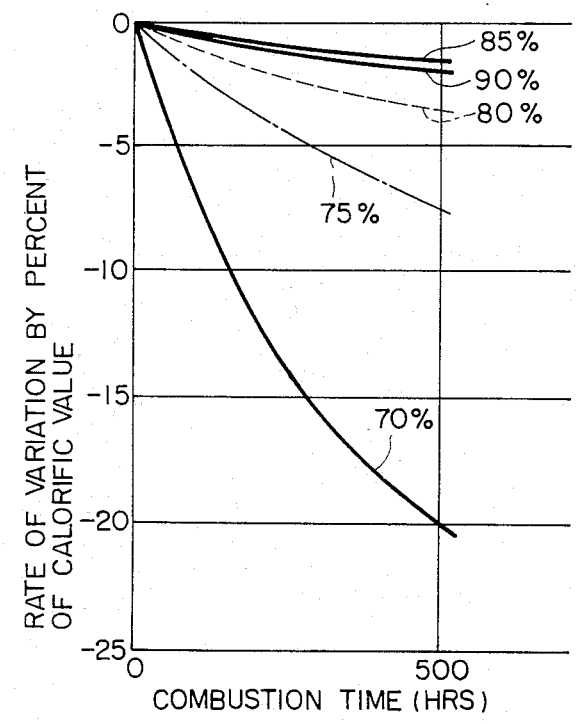
FIG. 8 is a graphical representation of a variation in calorific value in relation to variation in time for different glass fibers.
Figure 9:
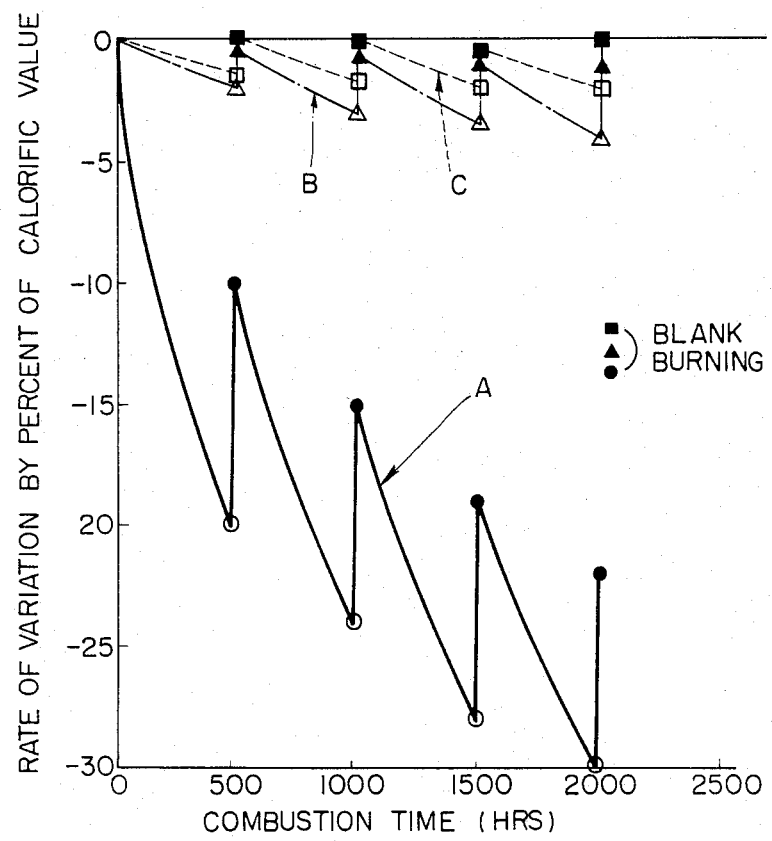
FIG. 9 is a graphical representation of a variation in calorific value in relation to variation in combustion time for different fiber glasses determined by a test in which a combustion cycle where the combustion is continued for 500 hours and then a blank burning is conducted for 30 minutes is repeated.

After completion of the cycle test shown in FIG. 9, the wicks were continuedly used for further combustion of 500 hours to determine a variation in calorific value, with the results shown in FIG. 8. The figure reveals that the wicks of the invention are scarcely or not molten by the blank burning and show a high sucking characteristic, with the calorific values being scarcely lowered.

From the results of the above tests, it will be understood that the prior art wick which was untreated at the top of the gasifying section shows a great lowering of the calorific values and a largely increasing rate of wick thickness, and are so greatly sintered at the glass fiber at the time of the blank burning that the fibers are combined together by fusing and the sucking rate of kerosene is lowered due to the melting of the fibers. As a consequence, an amount of the gasified fuel is reduced and the calorific value is lowered to a greater extent than that prior to the blank burning through an amount of produced tar is reduced.

On the other hand, the wicks of the invention whose gasifying section or portion were dealkalized show better results with regard to the calorific value, the increase in wick thickness, and a lowering of the calorific value after blank burning than the untreated wick.

When the treated portion of the gasifying section has a total content of $SiO_2$ and $Al_2O_3$ larger than 80%, it is hardly molten when subjected to a blank burning and thus shows little or no lowering of the calorific value after the blank burning.

EXAMPLE 2

Wicks similar to those obtained in Example 1 were used to conduct a test wherein each wick was employed for combustion of a modified oil for 50 hours and then subjected to a blank burning for 60 minutes, and then the above cycle of the procedure was repeated 20 times in total with the results shown in Table 1.

TABLE 1

| | Comparative Wicks | | Inventive Wicks | | |
|---|---|---|---|---|---|
| | Untreated glass fiber | Dealkalized glass fiber | Dealkalized glass fiber | Dealkalized glass fiber | Dealkalized glass fiber |
| Content of | 70% | 75% | 80% | 85% | 90% |

TABLE 1-continued

|  | Comparative Wicks | | Inventive Wicks | | |
| --- | --- | --- | --- | --- | --- |
|  | Untreated glass fiber | Dealkalized glass fiber | Dealkalized glass fiber | Dealkalized glass fiber | Dealkalized glass fiber |
| $SiO_2$ + $Al_2O_3$ |  |  |  |  |  |
| Before test (kcal) | 2220 | 2200 | 2250 | 2180 | 2220 |
| After 20 cycles | 1750 | 2050 | 2180 | 2130 | 2190 |

From the Table 1, it will be apparent that the wicks of the invention in which the gasifying sections are constituted of glass fiber masses containing $SiO_2$ and $Al_2O_3$ in amounts of 80% or more are scarcely lowered in calorific value after the 20 burning-blank burning cycles.

EXAMPLE 3

A gasifying section constituted of a dealkalized glass fiber mass having a content of $Al_2O_3$ and $SiO_2$ which was obtained in the same manner as in Example 1 was immersed in a silica sol solution with a concentration of 5% to a level of 8 mm from the top thereof and dried at 130° C. for 2 hours, followed by depositing a silica powder. The dealkalized glass fiber mass and the silica-deposited glass fiber mass used as a gasifying section of wick were each subjected to a combustion cycle in the same manner as in Example 2, with the results shown in Table 2 below.

TABLE 2

|  | Dealkalized glass fiber mass | Dealkalized and then silica-deposited glass fiber mass |
| --- | --- | --- |
| Before test (kcal) | 2180 | 2240 |
| After 20 cycles | 2130 | 2230 |

From Table 2, it will be apparent that the glass fiber mass which has been dealkalized and then deposited with a silica powder as shown in FIG. 4A shows little lowering of the calorific value and is small in amount of formed tars.

EXAMPLE 4

The glass fiber masses which had been dealkalized with or without being subsequently deposited at the upper portion thereof with a silica powder in the same manner as in Example 3 were further deposited with catalysts indicated in Table 3. The gasifying sections composed of these glass fiber masses were used to make wicks and subjected to a continuous combustion of 200 hours. The calorific values before and after the combustion of the wicks are shown in Table 3 below.

TABLE 3

|  | Before combustion | After combustion |
| --- | --- | --- |
| Untreated | 2190 kcal | 1820 kcal |
| dealkalized | 2200 | 2090 |
| dealkalized + Pt | 2180 | 2130 |
| dealkalized + MgO | 2250 | 2210 |
| dealkalized + silica + Pt | 2210 | 2180 |
| dealkalized + silica + MgO | 2240 | 2220 |
| dealkalized + silica + ferrite | 2190 | 2140 |

The results of Table 3 reveal that the glass fiber mass on which the catalysts of Pt, MgO and ferrite have been deposited shows only a small lowering of calories even when used under severe combustion conditions (of using a modified derosene) and a good combustion state is achieved.

In general, the burning wick should preferably meet the following requirements: The gasifying section of the wick has an excellent heat resistance; The gasifying section has a high sucking speed; The gasification of liquid fuel at the gasifying section proceeds rapidly and satisfactorily; The gasifying section is able to retain a liquid fuel sufficiently; and the gasifying section is preferred to be deposited with a catalyst for decomposing tars or carbonaceous materials. The dealkalized glass fiber satisfies almost the above requirements and thus is able to continue stable combustion over a long period.

That is, the glass fiber which has been dealkalized so that 80% or more of the fiber is made of silica, alumina or a mixture thereof shows some catalytic action due to the presence of silica or alumina and contributes to more or less decompose tar-like or carbonaceous substances. This is why the wick of the invention having a gasifying section which has been dealkalized at least at the top portion thereof has an excellent sucking characteristic even when used over a long period. In addition, even though tar-like or carbonaceous substances are accumulated on the gasifying section, they can be readily burnt off by blank burning, whereupon the glass fiber is not molten because of its high resistance to heat and can thus show stable characteristics over a long period.

EXAMPLE 4

| (1) Inorganic binder | Vitreous frit (for low softening point) + water glass | 100 parts |
| --- | --- | --- |
| Mat former | alumina | 50 parts |
| Mill additives | water glass, clay, water | 80 parts |

A composition of the above formulation was milled in a ball mill for 2 hours to form a slip and then applied to a glass fiber mass which had been dealkalized, followed by drying and sintering at 550° C. for 7 minutes. The fiber mass was used as a gasifying section of a wick. The thickness of the covering layer was 200 μm in average and 150 μm minimum.

| (2) Inorganic binder | Water glass | 30 parts |
| --- | --- | --- |
| Catalyst | $MnO_2$ | 30 parts |
|  | $Fe_2O_3$ | 20 parts |

A composition of the above formulation was milled in a ball mill for 1 hour and applied to a glass fiber mass of the same type as used above, followed by drying and sintering at 300° C. for 5 minutes. The layer thickness was 100 μm in average and 50 μm minimum.

The thus obtained fiber masses were used to make wicks and then subjected to a combustion test in which they were continuously used for burning for 500 hours and then subjected to a blank burning for 30 minutes and the procedure of this cycle was repeated. The results are shown in FIG. 9. In FIG. 9, curve A is obtained from a wick using a gasifying section composed of a glass fiber mass which has not been dealkalized, i.e. a prior art wick. In this case, tar-like substances are gradually accumulated or deposited on the gasifying section and thus calorific value varies greatly. Even when the blank burning is conducted, the calorific value is not returned so much and thus a quantity of combustion is considerably lowered during long use.

Curve B in FIG. 9 is obtained from a wick using a gasifying section according to the invention which is composed of a dealkalized glass fiber containing 90% of $SiO_2$ and $Al_2O_3$ in total. This is much more excellent than the prior art wick as is clearly seen in the figure.

Curve C in the figure is obtained from a wick using a gasifying section composed of the fiber used in B which has been deposited with the porous covering layer on the surface thereof. Tar-like or carbonaceous substances are hardly deposited due to the catalytic action of the catalyst contained in the porous covering layer and thus more excellent effects can be obtained as compared with the wick of Curve B.

Figure 10:
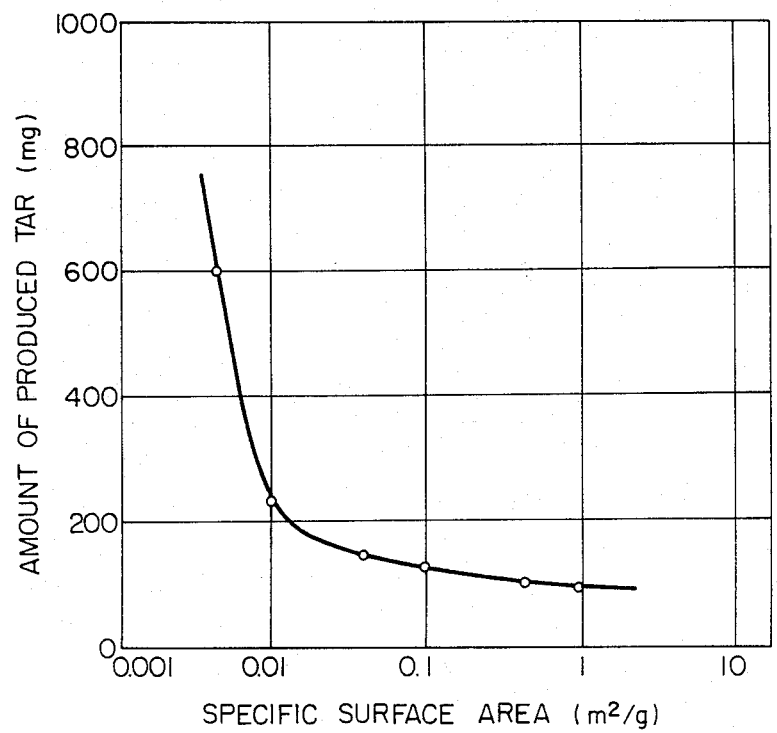
FIG. 10 is a graphical representation of an amount of produced tar residua in relation to variation in specific surface area.

FIG. 10 shows a curve of an amount of produced tar in relation to a specific surface area of the porous covering layer formed from the composition (1). From the figure, it will be seen that when the specific surface area is below 0.01 $m^2/g$, the amount of produced tar markedly increases. This is because when the specific surface area is smaller than the above-indicated value, an active area of the porous covering layer with regard to the tar-like substances is reduced.

What is claimed is:

1. A liquid fuel combustion apparatus comprising a fuel tank, a wick partially immersed in fuel within the tank, and means defining a combustion chamber enclosing an upper section of the wick, said wick having two sections, the upper section being a burning section made of a glass fiber material which has been dealkalized so that said upper section contains at least 80% or more of silica, alumina or a mixture thereof, there being present 70% to 90% silica in said upper section, said lower section being a suck up portion having a good fuel suck-up ability whereby the fuel sucked up from the suck-up portion is vaporized at the burning section and burned in the combustion chamber.

2. A liquid fuel combustion apparatus according to claim 1, wherein said upper section has a porous covering layer covering said dealkalized section to increase capillary action of said section.

3. A liquid fuel combustion apparatus according to claim 2, wherein said upper section has a catalyst for decomposing tar-like or carbonaceous substances or cracking the fuel into low molecular weight materials, said catalyst being locally deposited on the surface of said one section.

4. A liquid fuel combustion apparatus according to claim 2, wherein said porous covering layer is made of a vitreous frit and formed by a plasma jet technique.

5. A liquid fuel combustion apparatus according to claim 2, wherein said porous covering layer is made of a composition of 20–100 parts by weight of an inorganic binder and 2–80 parts by weight of mat former.

6. A liquid fuel combustion apparatus according to claim 2, wherein said porous covering layer has a specific surface area of not less than 0.01 $m^2/g$.

7. A liquid fuel combustion apparatus according to claim 2, wherein said porous covering layer is made of a composition of 20–100 parts by weight of an inorganic binder, and 2–50 parts by weight of a catalyst.

8. A liquid fuel combustion apparatus according to claim 2, wherein said porous covering layer is made of a composition of 20–100 parts by weight of an inorganic binder, 2–80 parts by weight of a mat former and 2–50 parts by weight of a catalyst.

9. A liquid fuel combustion apparatus according to claim 1, wherein said other section is composed of two sub-sections, one sub-section being immersed in the fuel and made of a synthetic fiber, the other sub-section being made of cotton, staple fiber or asbestos, each subsection being capable of sucking up and delivering fuel to the burning section.

10. A liquid fuel combustion apparatus comprising a fuel tank, a wick partially immersed in the fuel in the tank, and a means defining a combustion chamber enclosing an upper portion of said wick, said wick being made of a glass fiber material at least an ignitable dealkalized portion of which has a content of approximately 70–90 weight percent $SiO_2$, 0–30 weight percent $Al_2O_3$, 5–25 weight percent $B_2O_3$ and 1–2 weight percent alkali components while having 80% or more of $SiO_2$, $Al_2O_3$ or a combination thereof.

11. A liquid fuel combustion apparatus according to claim 10, wherein said wick has two sections each made of a glass fiber, wherein said dealkalized portion has a porous covering layer to thereby increase capillary action of the dealkalized portion.

12. A liquid fuel combustion apparatus according to claim 10, wherein said wick has a catalyst locally deposited on the surface of the dealkalized portion thereof.

13. A liquid fuel combustion apparatus according to claim 11, wherein said porous covering layer is made of vitreous frits and formed by a plasma jet technique.

14. A liquid fuel combustion apparatus according to claim 11, where said porous covering layer is made of 20–100 parts by weight of an inorganic binder, and 2–80 parts by weight of a mat former.

15. A liquid fuel combustion apparatus according to claim 11, wherein said porous covering layer is made of 20–100 parts by weight of an inorganic binder and 2–50 parts by weight of a catalyst.

16. A liquid fuel combustion apparatus according to claim 11, wherein said porous covering layer is made of 20–100 parts by weight of an inorganic binder, 2–80 parts by weight of a mat former, and 2–50 parts by weight of a catalyst.

17. A liquid fuel combustion apparatus according to claim 11, wherein said porous covering layer has a specific surface area of above 0.01 $m^2/g$.

18. In a liquid fuel combustion apparatus comprising a fuel tank, an inner cylinder vertically disposed at the center of the fuel tank, and having a multiplicity of apertures formed therein, an outer cylinder arranged to have a predetermined space between it and the outer peripheral surface of the inner cylinder, a red heat cylinder provided between said inner cylinder and said outer cylinder, said inner cylinder, outer cylinder and red heat cylinder establishing a combustion section, and a wick partially immersed in the fuel in the tank, an improvement wherein said wick is composed of two sections in contact with each other during combustion, one section of said wick being composed of a gasifying wick element having at least a top portion thereof made of a dealkalized glass fiber material comtaining 80% or more of silica, alumina or a combination thereof, there being present 70% to 90% silica in said top portion and having a porous covering layer at least at the top portion covering said dealkalized material to improve burning and reduce formation of tar, the other section thereof composed of a wick element having a good fuel sucking property.

19. A liquid fuel combustion apparatus according to claim 18, wherein said one section has a catalyst for the fuel or produced tar-like or carbonaceous substances locally deposited on the surface of said one section.

20. A liquid fuel combustion apparatus according to claim 18, wherein said porous covering layer is made of a vitreous frit and formed by a plasma jet technique.

21. A liquid fuel combustion apparatus according to claim 18, wherein said porous covering layer is made of 20-100 parts by weight of an inorganic binder, and 2-80 parts by weight of a mat former.

22. A liquid fuel combustion apparatus according to claim 18, wherein said porous covering layer is made of 20-100 parts by weight of an inorganic binder and 2-50 parts by weight of a catalyst.

23. A liquid fuel combustion apparatus according to claim 18, wherein said porous covering layer is made of 20-100 parts by weight of an inorganic binder, 2-80 parts by weight of a mat former, and 2-50 parts by weight of a catalyst.

24. A liquid fuel combustion apparatus according to claim 18, wherein said porous covering layer has a specific surface area of above 0.01 $m^2/g$.

25. A wick element for use in a liquid fuel combustion apparatus, said wick comprising first and second sections, said first section being immersible to suck up and deliver fuel to the second section from a fuel tank and being formed from a first material having good suck-up characteristics, said second section being a burning section made of dealkalized glass fiber material containing at least at a top portion thereof 80% or more of silica, alumina or a mixture thereof, there being present 70% to 90% silica in said top portion, said top portion thereby having a rough exterior surface, said rough surface having a porous covering layer to thereby increase capillary action of said glass fiber burning section, said glass fiber material being further operable to minimize a rate of variation of the calorific value of the burning section as a function of prolonged combustion.

* * * * *